(12) United States Patent
Naviasky et al.

(10) Patent No.: US 6,608,860 B1
(45) Date of Patent: Aug. 19, 2003

(54) LOW POWER DISSIPATION, HIGH LINEARITY TRANSMITTER

(75) Inventors: Eric H. Naviasky, Ellicott City, MD (US); Martin J. Mengele, Ellicott City, MD (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/434,592

(22) Filed: Nov. 5, 1999

Related U.S. Application Data
(60) Provisional application No. 60/107,453, filed on Nov. 6, 1998.

(51) Int. Cl.[7] .............................................. H04L 25/00
(52) U.S. Cl. ...................... 375/216; 375/278; 375/296; 375/297; 375/313; 375/377
(58) Field of Search ................................ 375/257, 216, 375/278, 296, 297, 313, 377

(56) References Cited

U.S. PATENT DOCUMENTS 4,488,144 A * 12/1984 Wollman ..................... 341/118
5,241,283 A * 8/1993 Sutterlin ..................... 330/267

* cited by examiner

Primary Examiner—Stephen Chin
Assistant Examiner—Guillermo Muñoz
(74) Attorney, Agent, or Firm—Bobby K. Truong; Hickman Palermo Truong & Becker LLP

(57) ABSTRACT

An improved transmitter capable of achieving high linearity with minimal power dissipation is disclosed, comprising a digital phase splitter and an output stage. The digital phase splitter includes a positive phase digital-to-analog converter (DAC) for converting the positive phase portion of a set of input digital data into an analog signal, and a negative phase DAC for converting the negative phase portion of the set of input digital data into another analog signal. The analog signals from the phase splitter are passed to the output stage for transmission onto a transmission medium. The transmitter may be operated in low power dissipation mode. Because the phases of the input digital signal are split in the digital domain prior to the output stage, the output stage experiences minimal crossover distortion. Consequently, the transmitter is able to minimize power dissipation without suffering from poor linearity performance.

23 Claims, 3 Drawing Sheets

LOW POWER DISSIPATION, HIGH LINEARITY TRANSMITTER

This application claims the benefit of U. S. Provisional Application No. 60/107,453, filed Nov. 6, 1998.

FIELD OF THE INVENTION

This invention relates generally to electronic circuits and more particularly to a transmitter which achieves high linearity with low power dissipation.

BACKGROUND OF THE INVENTION

In many electronics applications, it is necessary to send digital information from one machine to another machine across a transmission medium. In such applications, modems are often used. With a modem, it is possible to convert a set of digital signals into a set of analog signals, and then to send the analog signals across the transmission medium to another modem. It is also possible to receive a set of analog signals from another modem, and then to convert the analog signals back into a set of digital signals which may be processed by a digital mechanism. Thus, using modems, digitally based mechanisms can exchange information across an analog transmission medium.

In a typical modem design, an integrated analog front end (AFE) is used to interface the digitally-based mechanism (e.g. a computer) with the transmission medium (e.g. a twisted pair copper line). The AFE typically comprises two portions: (1) a transmitter; and (2) a receiver. The transmitter portion is responsible for converting digital signals from the digitally-based mechanism into analog signals, and then transmitting the analog signals onto the transmission medium. The receiver portion is responsible for receiving analog signals from other modems via the transmission medium, and then converting them into digital signals that can be processed by the digital mechanism. Together, these two portions provide the communications capabilities for the modem. Typically, the AFE of a modem is implemented as part of an overall integrated circuit.

With reference to FIG. 1, there is shown a typical embodiment for the transmitter portion of an AFE. As shown, the transmitter 100 comprises a digital-to-analog converter (DAC) 102 and a line driver 104. The DAC 102 is responsible for converting a set of digital signals from a digital mechanism (not shown) into a set of analog signals, while the line driver 104 is responsible for driving the analog signals onto the transmission medium 108. In effect, the line driver 104 acts as a buffer between the DAC 102 and the transmission line 108, which is usually a low impedance line (~100 Ohms). In this configuration, the line driver 104 uses voltage drive to generate the required output signals. To provide direct current (DC) isolation between the line driver 104 and the transmission line 108, the line driver 104 is coupled to the transmission line 108 via a transformer 106. In addition to DAC 102 and line driver 104, the transmitter 100 further comprises a pair of line termination resistors 110, 112. These resistors 110, 112, each having an impedance equal to half the impedance Rline of the transmission line 108, act as termination impedances for incoming analog signals (since incoming signals also go through the transmission line 108).

In order to properly drive analog signals onto the transmission line 108, the transmitter 100 needs to generate output signals which cause signals having the proper peak signal levels to appear on the transmission line 108. These peak signal levels are determined by various communications standards. Because of the presence of the termination resistors 110, 112, the line driver 104 needs to be able to generate voltages which are at least twice that of the peak signal levels. Given sufficiently large power supply voltages, this is not a problem. However, as noted previously, the AFE transmitter 100 is typically implemented as part of an overall integrated circuit, and as fabrication techniques improve, the power supply voltages provided to such integrated circuits have steadily decreased. They have now decreased to the point where the line driver 104 can no longer generate the necessary signal levels with a 1:1 turns ratio in the transformer 106. It is possible to achieve a voltage gain of n by changing the turns ratio of the transformer 106 from 1:1 to 1:n where n is greater than 1. The problem with this approach, however, is that it causes the current drive required of the line driver 104 to increase by the same factor n, which in turn increases the power dissipation of the line driver 104 by a factor n. Thus, the proper signal levels can be achieved, but at the expense of a significant increase in power dissipation. Since it is usually desirable to keep power dissipation to a minimum, this is not an attractive solution.

As an alternative, a more power efficient class AB current drive architecture may be used to limit power dissipation. While this approach is effective from a power standpoint, it is not effective from a performance standpoint. The class AB architecture typically suffers from poor linearity performance due to crossover distortion. Hence, neither approach is wholly satisfactory. As a result, an improved transmitter circuit is needed.

SUMMARY OF THE INVENTION

The present invention provides an improved transmitter which is capable of achieving high linearity with minimal power dissipation. According to one embodiment, the present invention comprises a digital phase splitter and an output stage. The digital phase splitter comprises a positive phase DAC for converting the positive phase portion of a set of input digital data into an analog signal, and a negative phase DAC for converting the negative phase portion of the set of input digital data into another analog signal. One of the main functions of the phase splitter is to separate, in the digital domain, the positive and the negative phases of the input digital signal, and to generate corresponding analog signals based upon the two phase portions. Once generated, the analog signals from the positive and negative phase DAC's are fed as inputs to the output stage. In one embodiment, the digital phase splitter is implemented as part of an overall integrated circuit which is powered by a power supply having a supply voltage of Vcc.

The output stage receives the analog signals from the DAC's, and in response, drives the analog signals onto a transmission medium, such as a transmission line, by way of a transformer. In doing so, the output stage generates, at its output, signals having the proper signal levels. These output signals are generated by a first and a second current sinks within the output stage, both of which are coupled to the output of the output stage.

In one embodiment, the output stage is implemented separately from the digital phase splitter using discrete components, and is powered by a power supply voltage Vdd which is separate from and is greater than the power supply voltage Vcc used to power the digital phase splitter integrated circuit. Supply voltage Vdd is selected such that it is sufficiently large to enable the output stage to generate the necessary output signal levels with just a 1:1 turns ratio in the transformer. By separating the output stage from the digital phase splitter integrated circuit, and by operating the output stage at a higher supply voltage, the present invention eliminates the need to increase the turns ratio of the transformer, and hence, eliminates the need to increase the current drive and power dissipation of the output stage. By doing so, the present invention makes it possible to drive the necessary signals onto the transmission line without increased power dissipation.

To further reduce power dissipation, the output stage is operated in a power efficient class AB current drive mode. In this mode, the current sinks are not turned fully off when they are not generating signals but instead are maintained in a semi-on, "idle" state by a small bias voltage. Operating the output stage in this mode helps to reduce power dissipation. Normally, class AB current drive mode is not a viable option in applications of this type because of the poor linearity performance caused by crossover distortion. However, because the present invention splits the phases of the input digital signal in the digital domain, and then generates corresponding analog signals based upon the split phase signals prior to the output stage, the output stage experiences minimal crossover distortion. Hence, the output stage is able to achieve high linearity even when operated in class AB current drive mode. In this manner, the present invention is able to minimize power dissipation without suffering from poor linearity performance.

DETAILED DESCRIPTION OF THE EMBODIMENT(S)

Figure 1:
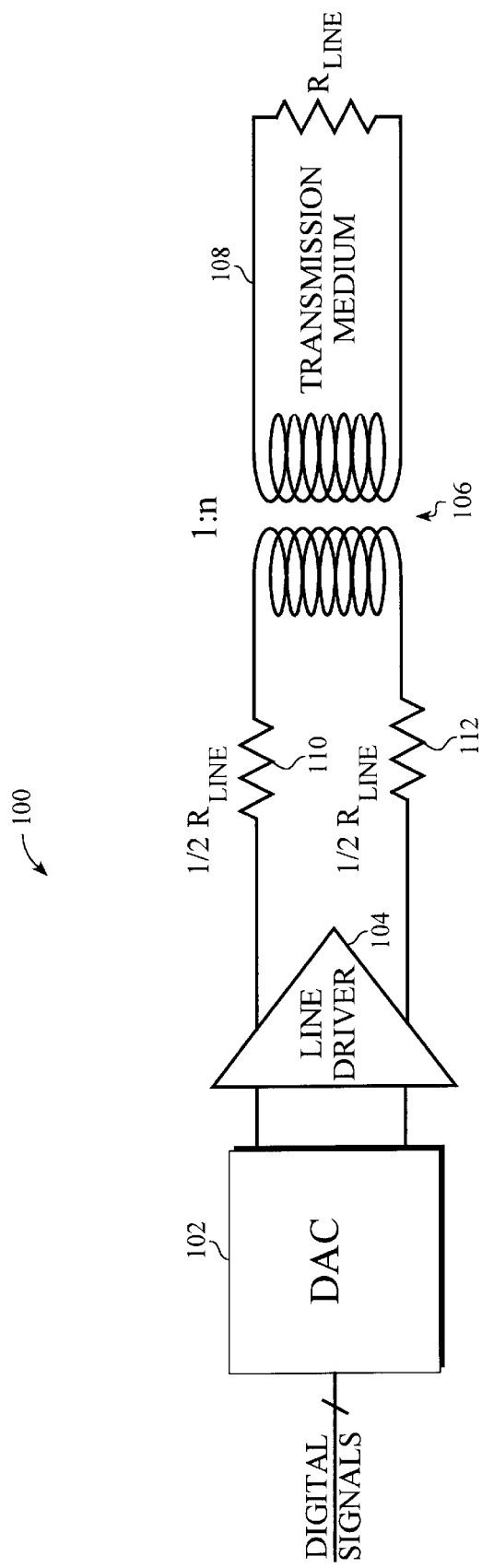
FIG. 1 is a block diagram of a typical transmitter configuration.
Figure 2:
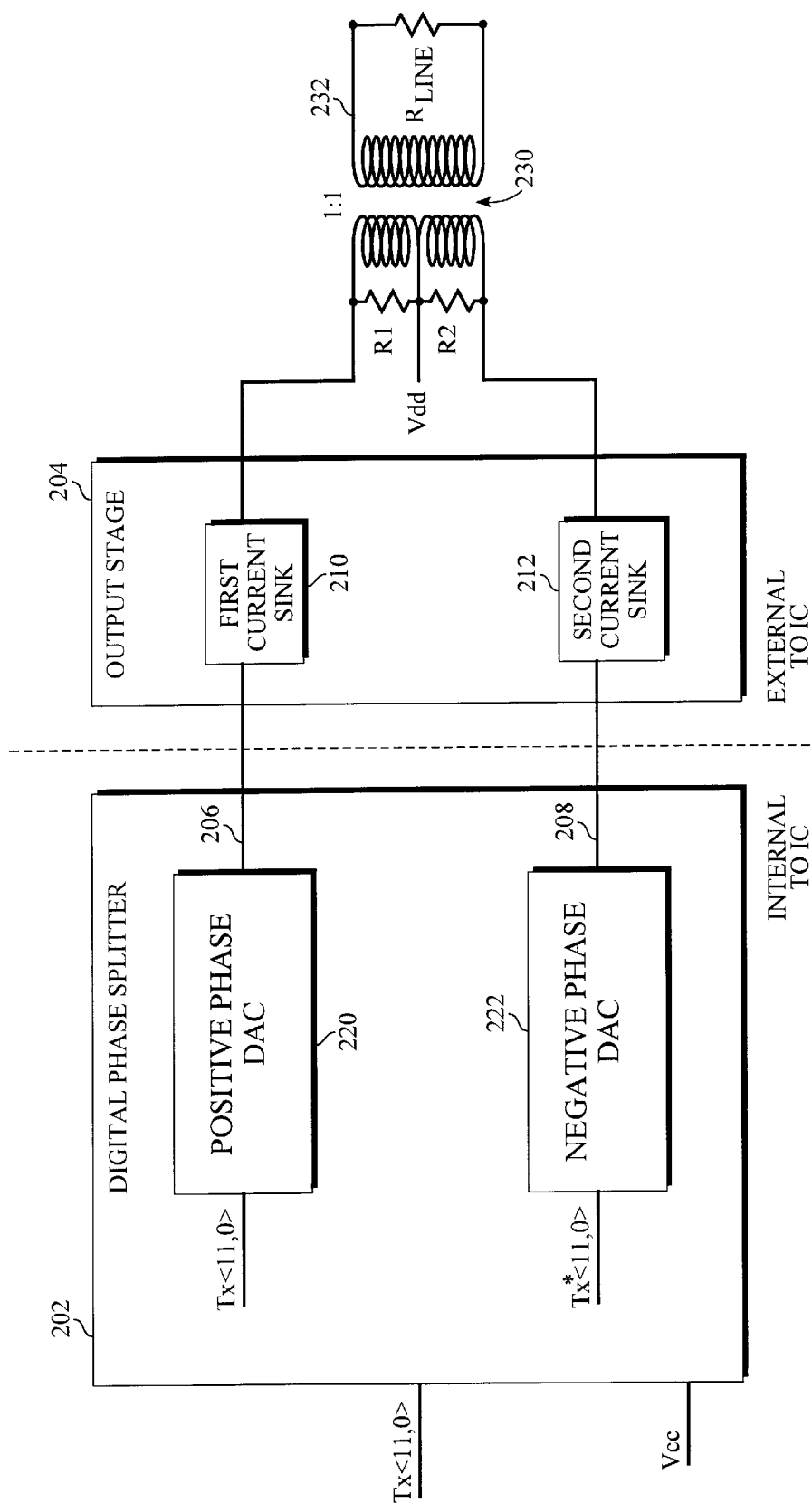
FIG. 2 is a block diagram providing an overview of the transmitter of the present invention.

With reference to FIG. 2, there is shown a diagrammatic overview of the transmitter of the present invention, wherein the transmitter comprises a digital phase splitter 202 and an output stage 204. The digital phase splitter 202 receives as input a set of digital data Tx, and provides as output two analog signals 206, 208. The analog output signal 206 is derived from a positive phase DAC 220 within the phase splitter 202, and the analog output signal 208 is derived from a negative phase DAC 222 within the phase splitter 202. As their names suggest, the positive and negative phase DAC's 220, 222 are responsible for converting the positive and negative phase portions of the input digital data Tx into corresponding analog signals. Thus, analog signal 206 represents the analog version of the positive phase portion of the input digital data Tx, while analog signal 208 represents the analog version of the negative phase portion of the input digital data Tx. According to one embodiment, the input digital data Tx at any particular time is either positive or negative in phase. As a result, only one of the DAC's 220, 222 is active at any particular time. By separately processing the positive and negative phases of the digital signal Tx in this manner, the digital phase splitter 202 performs the phase splitting function in the digital domain.

In one embodiment, the input digital data Tx is provided in accordance with the straight offset binary format. According to this format, whenever the most significant bit (MSB) of a set of data is a "0", the phase of the data is negative. Whenever the MSB is a "1", the phase of the data is positive. With this format, the largest negative phase value is achieved when all of the bits are "0". The largest positive phase value is achieved when all of the bits are "1", and the midpoint is where the MSB is a "1" and all of the other bits are "0". For example, suppose that the input digital data Tx is twelve bits long, as shown in FIG. 2, where bit 0 is the least significant bit (LSB) and bit 11 is the MSB. In such a case, the largest negative phase value is 000000000000, the largest positive phase value is 111111111111, and the midpoint is 100000000000. The value 000111000111 has a negative phase, and is somewhere between the midpoint and the largest negative phase value (000000000000), and the value 111000111000 has a positive phase, and is somewhere between the midpoint and the largest positive phase value (111111111111). Such a format makes it simple to determine the phase of a set of data. It also simplifies the process of converting the digital data Tx into analog signals. As shown in FIG. 2, the digital data Tx is provided as is to the positive phase DAC 220; however, it is the complement Tx* of the digital data Tx that is fed to the negative phase DAC 222. Providing the digital data to the DAC's 220, 222 in this manner enables the DAC's (which, in one embodiment, are identical) to properly convert the digital signals into analog signals. In one embodiment, the digital phase splitter is implemented as part of an integrated circuit. The integrated circuit is powered by a power supply having a supply voltage of Vcc (e.g. 3.3V).

The analog outputs 206, 208 of the phase splitter 202 are provided to the output stage 204 of the transmitter. More specifically, the output 206 of the positive phase DAC 220 is provided to the first current sink 210 of the output stage 204, and the output 208 of the negative phase DAC 222 is provided to the second current sink 212 of the output stage 204. In response to the analog signals 206, 208, the first current sink 210 and second current sink 212 drive signals having the appropriate signal levels onto the transmission medium 232 via the center-tapped transformer 230. The transmission medium 232 has an effective impedance of Rline; thus, to achieve an impedance balance for incoming signals (since incoming signals share the same transmission medium 232), two resistors R1 and R2 are implemented across the output of the output stage 204, with each resistor R1, R2 having an impedance equal to one half of Rline.

As noted previously, to minimize power dissipation, it is desirable to implement the output stage 204 in such a way that only a 1:1 turns ratio in the transformer 230 is needed to generate the necessary signal levels on the transmission medium 232. In one embodiment, this is achieved by implementing the output stage 204 separately from the integrated circuit of the phase splitter 202. That is, the output stage 204 is not implemented as part of the phase splitter 202 integrated circuit but rather external thereto using discrete components. By doing so, the output stage 204 is freed from using the low level power supply Vcc of the integrated circuit. Instead, the output stage 204 may use a higher level power supply Vdd to enable it to more easily generate the necessary signal levels. The voltage level of the power supply Vdd (which may, for example, be 5V) is selected such that it enables the output stage 204 to generate the necessary signal levels on the transmission medium 232 with just a 1:1 turns ratio on the transformer 230. By implementing the output stage 204 in this manner, the present invention eliminates the need to increase the turns ratio of the transformer 230. This in turn eliminates the need for increased current generation and increased power dissipation. As a result, power dissipation is kept at a minimum.

To further reduce power dissipation, the output stage 204 in one embodiment is operated in a power efficient class AB current drive mode. In this mode, the devices in the first current sink 210 and the second current sink 212 are not fully turned off when they are not generating signals. Instead, they are maintained in a semi-on, "idle" state by a small bias current. Operating the output stage 204 in this manner helps to reduce power dissipation. Normally, class AB current drive mode is not a viable option in applications of this type because of the poor linearity performance caused by crossover distortion. However, because the present invention splits the phases of the input digital signal Tx in the digital domain and then generates corresponding analog signals based upon the split phase signals prior to the output stage 204, the output stage 204 experiences minimal crossover distortion. Hence, the output stage 204 is able to achieve high linearity even when operated in class AB current drive mode. As a result, the transmitter of the present invention is able to minimize power dissipation without suffering from poor linearity performance.

Figure 3:
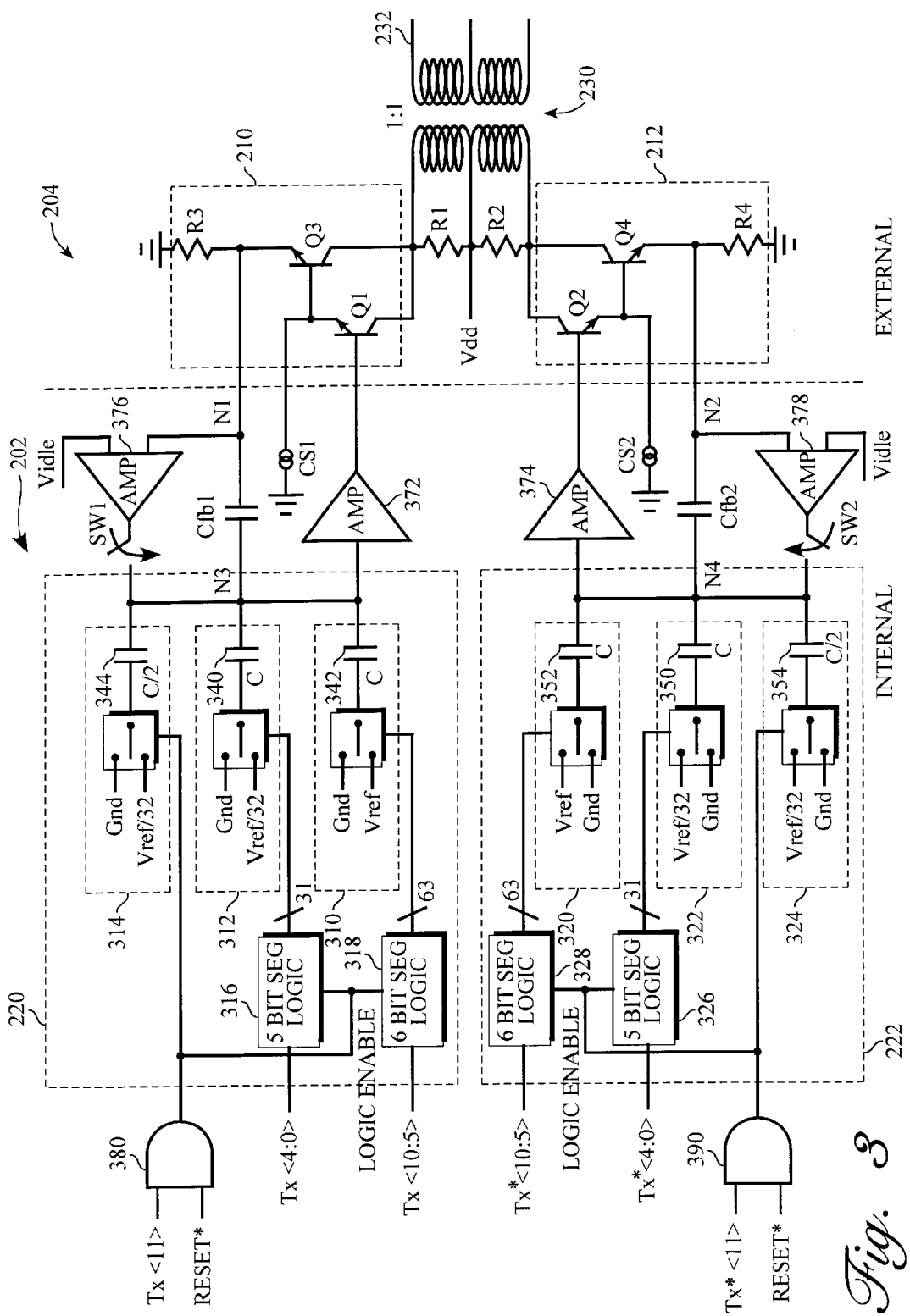
FIG. 3 is a detailed circuit diagram of one possible embodiment of the transmitter of the present invention.

With reference to FIG. 3, there is shown a detailed circuit diagram of one possible embodiment of the transmitter of the present invention. FIG. 3 is an elaboration of FIG. 2; hence, like elements are labeled with like reference numerals.

As shown in FIG. 3, the digital phase splitter 202 comprises a positive phase DAC 220 and a negative phase DAC 222. In the embodiment shown, DAC's 220, 222 are implemented as switched capacitor DAC's, with each DAC 220, 222 comprising a plurality of unit cells 310, 312, 314, 320, 322, and 324. Each unit cell comprises a capacitor and a switching mechanism. The switching mechanism selectively couples the capacitor to either a reference voltage or ground based upon the state of an input control signal. By properly controlling the switching mechanisms within each unit cell, each of the DAC's 220, 222 produces a proper analog signal based upon a set of input digital signals.

Referring specifically now to the positive phase DAC 220, there is shown a DAC comprising a 5 bit segment logic 316, a 6 bit segment logic 318, and a plurality of unit cells 310, 312, 314. In the embodiment shown, the 5 bit segment logic 316 receives the lowest five bits Tx<4:0> of the input digital data Tx, and the 6 bit segment logic 318 receives the next six bits Tx<5:10> of the digital data Tx. The MSB Tx<11> of the digital data Tx is fed to one of the inputs of an AND gate 380. AND gate 380 also receives as input the complement RESET* of a RESET signal. As will be discussed further in a later section, the RESET signal is asserted prior to each transmission to initialize the transmitter for proper operation. During normal operation, the RESET signal is deasserted. The output of the AND gate 380 is fed directly to the unit cell 314 and to the logic enable inputs of the 5 bit and 6 bit segment logics 316, 318. Notice that the output of AND gate 380 is asserted only when the MSB Tx<11> has a value of "1" and when the RESET signal is deasserted (which is the case during normal operation). Since the MSB will only have a value of "1" when the phase of the input digital data Tx is positive, logics 316 and 318, and hence, DAC 220 will only be active when the phase of the digital data Tx is positive. Since DAC 220 is the positive phase DAC, this is as it should be.

In response to the lowest five bits of the input digital data Tx, the 5 bit segment logic 316 generates a plurality of output bits, where the number of output bits generated is equal to $2^n-1$, where n is equal to the number of input bits (which, in the case of the 5 bit logic 316, is five). Hence, with five input bits, the 5 bit segment logic 316 generates thirty-one output bits. Each one of these output bits is fed as input to a corresponding unit cell 312. With thirty-one output bits, there are thirty-one corresponding unit cells 312. Only one unit cell 312 is shown in FIG. 3 for the sake of simplicity. The output bit fed to each unit cell 312 determines whether the capacitor 340 within that unit cell 312 is coupled to ground or to a reference voltage. In one embodiment, if the value of the output bit is "0", then the capacitor 340 is coupled to the reference voltage. If the value of the output bit is "1", then the capacitor is coupled to ground. If coupled to the reference voltage, the capacitor 340 will transfer no charge and hence, will not contribute to the value of the eventual output analog signal. On the other hand, if the capacitor 340 is coupled to ground, then it will transfer charge and it will contribute to the value of the output analog signal. Thus, depending upon the values of the output bits from the 5 bit segment logic 316, some, none, or all of the capacitors 340 may contribute to the output analog signal.

In one embodiment, the 5 bit logic 316 acts as a thermometer encoder, where the number of output bits having a value of "1" is equivalent to the decimal value of the binary input. For example, suppose that the input to the 5 bit segment logic 316 is 00111. The decimal value of this binary input is seven; thus, the lowest seven bits of the 5 bit logic 316 output will each have a value of "1", while the highest twenty-four bits of the output will each have a value of "0". Similarly, if the input to the logic 316 is 10000 (having a decimal value of sixteen), then the lowest sixteen bits of the 5 bit logic 316 output will each have a value of "1" while the highest fifteen bits of the output will each have a value of "0". Thus, like a thermometer, the number of output bits having values of "1" rises as the decimal value of the input bits Tx<0:4> rises.

The 6 bit segment logic 318 functions similarly to the 5 bit segment logic 316. Specifically, the 6 bit segment logic 318 receives the next six higher bits Tx<10:5> of the digital data Tx. In response to these six input bits, the 6 bit segment logic 318 generates $2^n-1$ output bits, where n is equal to the number of input bits. Since n in this case is six, the 6 bit segment logic 318 generates sixty-three output bits. Each one of these output bits is fed as input to a corresponding unit cell 310. With sixty-three output bits, there are sixty-three corresponding unit cells 310. For the sake of simplicity, only one unit cell 310 is shown in FIG. 3. The output bit fed to each unit cell 310 determines whether the capacitor 342 within that unit cell 310 is coupled to ground or to a reference voltage. In one embodiment, if the value of the output bit is "0", then the capacitor 342 is coupled to the reference voltage. If the value of the output bit is "1", then the capacitor is coupled to ground. If coupled to the reference voltage, the capacitor 342 will transfer no charge and hence, will not contribute to the value of the eventual output analog signal. On the other hand, if the capacitor 342 is coupled to ground, then it will transfer charge and it will contribute to the value of the output analog signal. Thus, depending upon the values of the output bits from the 6 bit segment logic 318, some, none, or all of the capacitors 342 may contribute to the output analog signal.

In one embodiment, the 6 bit logic 318 functions in a manner very similar to that of the 5 bit logic 316. Namely, the 6 bit logic 318 also acts as a thermometer encoder, wherein the number of output bits having a value of "1" is equivalent to the decimal value of the binary input. Thus, if the input to the 6 bit segment logic 318 is 000111 (having a decimal value of seven), then the lowest seven bits of the 6 bit logic 318 output will each have a value of "1" while the highest fifty-six bits of the output will each have a value of "0". Similarly, if the input to the logic 318 is 010000 (having a decimal value of sixteen), then the lowest sixteen bits of the 6 bit logic 318 output will each have a value of "1" while the highest forty-seven bits of the output will each have a value of "0". Thus, like 5 bit logic 316, the number of output bits having values of "1" rises as the decimal value of the input bits Tx<10:5> rises.

In addition to the unit cells 310 and 312, the positive phase DAC 220 further comprises unit cell 314. There is only one instance of this unit cell 314 and it derives its control input from the output of the AND gate 380, which in turn, derives its output based upon the MSB Tx<11> of the digital data Tx. If the MSB has a value of "0" during regular operation, then the capacitor 344 in this unit cell 314 is coupled to a reference voltage, and hence, transfers no charge. If the MSB has a value of "1" during regular operation, then the capacitor 344 is coupled to ground, and hence, transfers a charge. With one unit cell 314, thirty-one unit cells 312, and sixty-three unit cells 310, the positive phase DAC 220 comprises ninety-five unit cells. The outputs of all of these unit cells 310, 312, 314 are summed at node N3 to produce an overall analog output. This output represents the analog counterpart of the positive phase portion of the input digital data Tx. At this point, it should be noted that while the structures of the unit cells 310, 312, 314 are very similar, the values of the components and voltages used in the unit cells vary to accommodate proper weighting. Specifically, note that the reference voltage Vref used in unit cell 310 is thirty-two times greater in magnitude than the reference voltage Vref/32 used in unit cells 312 and 314, and that the capacitance value C/2 of capacitor 344 is one half the capacitance value C of capacitors 340 and 342. With these values, the bits in the digital data Tx are properly weighted to provide an appropriate output analog signal. Other values may be used to achieve the same result. Such modifications are within the scope of the present invention.

Thus far, the positive phase DAC 220 has been described with reference to 5 bit and 6 bit segments. While this is an advantageous arrangement, it should be noted that other arrangements (e.g. 4 bit and 7 bit segments, or no segmentation at all) may also be used. Such other arrangements are within the scope of the present invention.

Turning now to the negative phase DAC 222, this DAC 222 has the same structure as the positive phase DAC 220. The main difference between the two is that the negative phase DAC 222 receives the complement Tx* of the input digital data Tx rather than the digital data Tx itself. Thus, the 5 bit segment logic 326 of the negative phase DAC 222 receives the lowest five bits Tx*<4:0> of the complement of the input digital data Tx, and the 6 bit segment logic 328 of the negative phase DAC 222 receives the next six bits Tx*<5:10> of the complement of the digital data Tx. The MSB Tx*<11> of the complement of the digital data Tx is fed to one of the inputs of an AND gate 390. AND gate 390 also receives as input the complement RESET* of the RESET signal (introduced previously). The output of the AND gate 380 is fed directly to the unit cell 324 and to the logic enable inputs of the 5 bit and 6 bit segment logics 326, 328. Notice that the output of AND gate 390 is asserted only when the MSB Tx*<11> of the complement of digital data Tx has a value of "1" and when the RESET signal is deasserted (which is the case during normal operation). Since the MSB Tx*<11> of the complement of the digital data Tx will only have a value of "1" when the phase of the input digital data Tx is negative, logics 326 and 328, and hence, DAC 222 will only be active when the phase of the digital data Tx is negative. Since DAC 222 is the negative phase DAC, this is as it should be.

In all other respects, the two DAC's 220, 222 are identical. Namely, 5 bit segment logic 326 is identical to 5 bit segment logic 316, 6 bit segment logic 328 is identical to 6 bit segment logic 318, unit cell 324 is identical to unit cell 314, unit cells 322 are identical to unit cells 312, and unit cells 320 are identical to unit cells 310. Thus, the two DAC's 220, 222 operate very similarly. To obtain an overall analog output, the negative phase DAC 222 sums the outputs of the one unit cell 324, the thirty-one unit cells 322, and the sixty-three unit cells 320. The sum of these outputs appear at node N4. This output represents the analog counterpart of the negative phase portion of the input digital data Tx.

The outputs N3, N4 from the DAC's 220 222 are fed to corresponding amplifier circuits. Specifically, the output N3 of the positive phase DAC 220 is fed to amplifier 372. In one embodiment, amplifier 372 is implemented as a high gain amplifier optimized for wideband alternating current (AC) performance with a single ended input. In response, the amplifier 372 provides an output signal to the first current sink 210 of the output stage 204 based upon the signal appearing at node N3. Notice that the output N3 is also coupled to the first current sink 210 via a capacitor Cfb1. Together, the amplifier 372, the first current sink 210, and the capacitor Cfb1 form a feedback loop. Since the amplifier 372 is a high gain amplifier, the effect of this feedback loop is that the amplifier 372 will produce the necessary output signals to maintain the voltage at node N3 at a fairly constant voltage. Thus, when the voltage at node N3 changes in response to a set of input digital data Tx, the output of the amplifier 372 changes in the manner necessary to maintain the voltage at N3 relatively constant. In this manner, the analog output of the positive phase DAC 220 is manifested to the first current sink 210.

Similarly, the output N4 of the negative phase DAC 222 is fed to amplifier 374. In one embodiment, amplifier 374 is implemented as a high gain amplifier optimized for wideband alternating current (AC) performance with a single ended input. In response, the amplifier 374 provides an output signal to the second current sink 212 of the output stage 204 based upon the signal appearing at node N4. The output N4 is also coupled to the second current sink 212 via a capacitor Cfb2. Together, the amplifier 374, the second current sink 212, and the capacitor Cfb2 form a feedback loop. Since the amplifier 374 is a high gain amplifier, the effect of this feedback loop is that the amplifier 374 will produce the necessary output signals to maintain the voltage at node N4 at a fairly constant voltage. Thus, when the voltage at node N4 changes in response to a set of complement digital data Tx*, the output of the amplifier 374 changes in the manner necessary to maintain the voltage at N4 relatively constant. In this manner, the analog output of the negative phase DAC 222 is manifested to the second current sink 212.

In addition to the elements already described, the phase splitter 202 further comprises current sources CS1 and CS2, and initializing amplifiers 376 and 378. These elements are used to properly bias the devices in the first current sink 210 and second current sink 212 to cause the output stage 204 to operate in class AB current drive mode, and to initialize the transmitter to prepare it for transmission. More specifically, amplifier 376, which in one embodiment is a high gain, low bandwidth, low offset amplifier, has one input coupled to a voltage Vidle, and another input coupled to node N1. The output of amplifier 376 is coupled, via a switch SW1, to the output N3 of the positive phase DAC 220. A feedback loop is formed with amplifier 372 and the first current sink 210. When switch SW1 is closed (this occurs prior to each transmission), a closed feedback loop is formed which causes node N3 to be set to an initial operating voltage, and node N1 to be set to Vidle. This serves to initialize the positive phase DAC 220 and the first current sink 210 for normal operation. Since ample time is allotted for initialization prior to transmission, the amplifier 376 only needs to be optimized for DC accuracy. Once these components are initialized, the switch SW1 is re-opened to enable regular operation.

Similarly, amplifier 378, which in one embodiment is a high gain, low bandwidth, low offset amplifier, has one input coupled to a voltage Vidle, and another input coupled to node N2. The output of amplifier 378 is coupled, via a switch SW2, to the output N4 of the negative phase DAC 222. A feedback loop is formed with amplifier 374 and the second current sink 212. When switch SW2 is closed (this occurs prior to each transmission), a closed feedback loop is formed which causes node N4 to be set to an initial operating voltage, and node N2 to be set to Vidle. This serves to initialize the negative phase DAC 222 and the second current sink 212 for normal operation. Since ample time is allotted for initialization prior to transmission, the amplifier 378 only needs to be optimized for DC accuracy. Once these components are initialized, the switch SW2 is re-opened to enable regular operation.

In one embodiment, all of the elements shown in FIG. 3 as being "internal" are implemented as part of an overall integrated circuit powered by a power supply voltage Vcc. All of the elements shown as "external" (i.e. the output stage) are implemented separately from the integrated circuit using discrete components, and are powered by a higher power supply voltage Vdd. Voltage Vdd is selected such that it is sufficiently large to enable the output stage 204 to generate output signals having the necessary signal levels with just a 1:1 turns ratio of the transformer 230.

As shown in FIG. 3, the output stage 204 comprises a first current sink 210 and a second current sink 212. According to one embodiment, the first current sink 210 comprises a resistor R3 and two bipolar junction transistors Q1 and Q3. The resistor R3 has one of its terminals coupled to ground, and another terminal coupled to node N1. The transistor Q3 has its emitter terminal coupled to node N1 and resistor R3, its collector terminal coupled to the output of the output stage 204, and a base terminal coupled to current source CS1 and transistor Q1. In turn, transistor Q1 has its emitter terminal coupled to the current source CS1 and transistor Q3, its collector terminal coupled to the output of the output stage 204, and a base terminal coupled to the output of amplifier 372. It is transistor Q1 that receives, via amplifier 372, the output of the positive phase DAC 220.

Bias to the transistors Q1 and Q3 is provided by the current source CS1 and the voltage on node N1 (which is set to Vidle at initialization), respectively. Since the output stage 204 is operated in AB current drive mode, transistors Q1 and Q3 are biased such that even when they are not generating an output, they are not fully turned off. Instead, they are maintained in a semi-on, "idle" state. Accordingly, proper values are selected for Vidle and CS1 to maintain the transistors Q1 and Q3 in this idle state when they are not generating an output. Further, to optimize linearity performance, Vidle and CS1 are selected such that they minimize crossover distortion experienced by the first current sink 210. The values for Vidle and CS1 will depend upon many factors, including the specific elements used to implement the output stage 204. As a result, they are implementation specific.

Like first current sink 210, second current sink 212 also comprises a resistor R4 and two bipolar junction transistors Q2 and Q4. The resistor R4 has one terminal coupled to ground, and another coupled to node N2. The transistor Q4 has its emitter terminal coupled to node N2 and resistor R4, its collector terminal coupled to the output of the output stage 204, and a base terminal coupled to current source CS2 and transistor Q2. In turn, transistor Q2 has its emitter terminal coupled to the current source CS2 and transistor Q4, its collector terminal coupled to the output of the output stage 204, and a base terminal coupled to the output of amplifier 374. Transistor Q2 receives, via amplifier 374, the output of the negative phase DAC 222.

Bias to the transistors Q2 and Q4 is provided by the current source CS2 and the voltage on node N2 (which is also set to Vidle at initialization), respectively. Since the output stage 204 is operated in AB current drive mode, transistors Q2 and Q4 are biased such that even when they are not generating an output, they are not fully turned off. Instead, they are maintained in a semi-on, "idle" state. Accordingly, proper values are selected for Vidle and CS2 to maintain the transistors Q2 and Q4 in this idle state when they are not generating an output. Further, to optimize linearity performance, Vidle and CS2 are selected such that they minimize crossover distortion experienced by the second current sink 212. The values for Vidle and CS2 will depend upon many factors, including the specific elements used to implement the output stage 204. As a result, they are implementation specific.

The structure of the transmitter of the present invention has been disclosed. With reference to FIG. 3, the operation of the transmitter will now be described. Prior to each data transmission, the transmitter is initialized by asserting the RESET signal. Assertion of the RESET signal causes switches SW1 and SW2 to be closed. This in turn causes nodes N3 and N4 to be set to an initial operating voltage, and nodes N1 and N2 to be set to Vidle to properly bias transistors Q3 and Q4. In addition, the RESET signal causes each of the switching mechanisms in each of the unit cells 310, 312, 314, 320, 322, and 324 to be set such that the capacitor within that unit cell is coupled to the reference voltage. Once all of that is done, the transmitter is initialized. Thereafter, the RESET signal is deasserted to cause the switches SW1 and SW2 to be re-opened, and to enable the segment logics 316, 318, 326, and 328. The transmitter is now ready for regular operation.

After initialization, a set of input digital data Tx is received. If the phase of the data Tx is positive, then the positive phase DAC 220 is activated to convert the input digital data Tx into a corresponding analog signal appearing at node N3. In response to this signal, the amplifier 372 sends an output signal to the first current sink 210. In turn, the first current sink 210 sinks current from the output of the output stage 204 to drive an appropriate signal onto the transmission medium 232 via the transformer 230. On the other hand, if the phase of the input digital data Tx is negative, then the negative phase DAC 222 is activated to convert the complement Tx* of the input digital data Tx into a corresponding analog signal appearing at node N4. In response to this signal, the amplifier 374 sends an output signal to the second current sink 212. In turn, the second current sink 212 sinks current from the output of the output stage 204 to drive an appropriate signal onto the transmission medium 232 via the transformer 230. In this manner, signals having the appropriate signal levels and polarity are driven onto the transmission medium 232 in response to a set of input digital data Tx. With the present invention, this is achieved with minimal power dissipation and high linearity performance.

At this point, it should be noted that although the invention has been described with reference to specific embodiments, it should not be construed to be so limited. Various modifications can be made by those of ordinary skill in the art with the benefit of this disclosure without departing from the spirit of the invention. For example, the input digital data Tx has been described as being twelve bits long and having a straight offset binary format. It should be noted that the invention is not so limited. Rather, the invention may be applied to any desired data length and any desired data format. These and other modifications and extensions are within the spirit and scope of the present invention. Thus, the invention should not be limited by the specific embodiments used to illustrate it but only by the scope of the appended claims.

What is claimed is:

1. A transmitter, comprising:
   a phase splitting mechanism having an input for receiving a set of input digital signals, a first output, and a second output, said phase splitting mechanism separating said set of input digital signals into a positive phase portion comprising a first set of digital signals, and a negative phase portion comprising a second set of digital signals different from said first set of digital signals, said phase splitting mechanism converting said positive phase portion of said input digital signals into a first analog signal and providing said first analog signal at said first output, and converting said negative phase portion of said input digital signals into a second analog signal and providing said second analog signal at said second output; and
   an output stage coupled to said first and second outputs of said phase splitting mechanism for receiving said first and second analog signals, said output stage generating, based upon said first and second analog signals, an output signal having required signal levels, said output stage driving said output signal onto a transmission medium.

2. The transmitter of claim 1, wherein said phase splitting mechanism is implemented as part of an integrated circuit, and wherein said output stage is implemented separately from said phase splitting mechanism and said integrated circuit.

3. The transmitter of claim 2, wherein said output stage is implemented using discrete components.

4. The transmitter of claim 2, wherein said integrated circuit is powered by a first power supply having a first supply voltage, and wherein said output stage is powered by a second power supply having a second supply voltage which is higher than said first supply voltage.

5. The transmitter of claim 1, wherein said output stage is operated in class AB current drive mode.

6. The transmitter of claim 1, wherein said output stage comprises a first current sink coupled to receive said first analog signal, and a second current sink coupled to receive said second analog signal.

7. The transmitter of claim 6, wherein only one of said first and second current sinks is active at any one time.

8. The transmitter of claim 6, wherein said output stage is operated in class AB current drive mode.

9. The transmitter of claim 1, wherein said phase splitting mechanism comprises:
   a positive phase digital-to-analog converter (DAC) for converting the positive phase portion of said set of input digital signals into a first analog equivalent; and
   a negative phase DAC for converting the negative phase portion of said set of input digital signals into a second analog equivalent.

10. The transmitter of claim 9, wherein only one of said positive phase DAC and said negative phase DAC is active for any particular set of input digital signals.

11. The transmitter of claim 10, wherein said output stage comprises a first current sink coupled to receive said first analog signal, and a second current sink coupled to receive said second analog signal.

12. The transmitter of claim 11, wherein only one of said first and second current sinks is active at any one time.

13. The transmitter of claim 11, wherein said output stage is operated in class AB current drive mode.

14. The transmitter of claim 11, wherein said phase splitting mechanism further comprises:
   a first amplifier having an input coupled to receive said first analog equivalent, and an output for providing said first analog signal to said first current sink; and
   a capacitor having a first terminal coupled to said input of said amplifier and a second terminal coupled to said first current sink.

15. The transmitter of claim 14, wherein said first amplifier is a high gain, wide bandwidth amplifier having a single ended input.

16. The transmitter of claim 14, wherein said phase splitting mechanism further comprises:
   a second amplifier having a first input coupled to an idle voltage, a second input coupled to said first current sink, and an output; and
   a switch for selectively coupling the output of said second amplifier to the input of said first amplifier.

17. The transmitter of claim 16, wherein said second amplifier is a high gain, low bandwidth, low offset amplifier.

18. The transmitter of claim 11, wherein said phase splitting mechanism further comprises:
   a first amplifier having an input coupled to receive said second analog equivalent, and an output for providing said second analog signal to said second current sink; and
   a capacitor having a first terminal coupled to said input of said amplifier and a second terminal coupled to said second current sink.

19. The transmitter of claim 18, wherein said first amplifier is a high gain, wide bandwidth amplifier having a single ended input.

20. The transmitter of claim 18, wherein said phase splitting mechanism further comprises:
   a second amplifier having a first input coupled to an idle voltage, a second input coupled to said second current sink, and an output; and
   a switch for selectively coupling the output of said second amplifier to the input of said first amplifier.

21. The transmitter of claim 20, wherein said second amplifier is a high gain, low bandwidth, low offset amplifier.

22. The transmitter of claim 9, wherein said positive phase DAC receives said set of input digital signals as input, and wherein said negative phase DAC receives the complement of said set of input digital signals as input.

23. A transmitter, comprising:
   a phase splitting mechanism having an input for receiving a set of input digital signals, a first output, and a second output, said phase splitting mechanism converting a positive phase portion of said input digital signals into a first analog signal and providing said first analog signal at said first output, and converting a negative phase portion of said input digital signals into a second analog signal and providing said second analog signal at said second output; and
   an output stage coupled to said first and second outputs of said phase splitting mechanism for receiving said first and second analog signals, said output stage generating, based upon said first and second analog signals, an output signal having required signal levels, said output stage driving said output signal onto a transmission medium;
   wherein said phase splitting mechanism comprises:
   a positive phase digital-to-analog converter (DAC) for converting the positive phase portion of said set of input digital signals into a first analog equivalent; and
   a negative phase DAC for converting the negative phase portion of said set of input digital signals into a second analog equivalent; and
   wherein said positive phase DAC receives said set of input digital signals as input, and wherein said negative phase DAC receives the complement of said set of input digital signals as input.

* * * * *